(12) United States Patent
Crigler et al.

(10) Patent No.: US 12,305,343 B2
(45) Date of Patent: May 20, 2025

(54) IN-LINE DAMPING SYSTEMS AND METHODS

(71) Applicant: Structural Technologies, LLC, Columbia, MD (US)

(72) Inventors: John R. Crigler, Woodbine, MD (US); Robert William Sward, Keller, TX (US); Eric Martin Sommer, Colleyville, TX (US); Justin Malcolm Campbell, Keller, TX (US); Christopher Daryl Ledford, Irving, TX (US); Simon Ruas, Fribourg (CH)

(73) Assignee: Structural Technologies, LLC, Columbia, MD (US)

( * ) Notice: Subject to any disclaimer, the term of this patent is extended or adjusted under 35 U.S.C. 154(b) by 685 days.

(21) Appl. No.: 17/702,976

(22) Filed: Mar. 24, 2022

(65) Prior Publication Data

US 2022/0333319 A1 Oct. 20, 2022

Related U.S. Application Data

(63) Continuation of application No. PCT/US2020/054560, filed on Oct. 7, 2020.

(60) Provisional application No. 62/911,660, filed on Oct. 7, 2019.

(51) Int. Cl.
*E01D 19/16* (2006.01)
*E01D 11/04* (2006.01)
*F16F 7/08* (2006.01)

(52) U.S. Cl.
CPC ............... *E01D 19/16* (2013.01); *F16F 7/08* (2013.01); *E01D 11/04* (2013.01)

(58) Field of Classification Search
CPC ............... E01D 19/16; E01D 1/04; F16F 7/08
See application file for complete search history.

(56) References Cited

U.S. PATENT DOCUMENTS

| | | | |
|---|---|---|---|
| 5,857,712 A | 1/1999 | Kato | |
| 6,292,967 B1 | 9/2001 | Tabatabai et al. | |
| 8,769,882 B2 * | 7/2014 | Ebaugh | E01D 19/16 52/173.1 |
| 2002/0170792 A1 | 11/2002 | Phelan et al. | |

(Continued)

FOREIGN PATENT DOCUMENTS

CN 105178184 A * 12/2015

OTHER PUBLICATIONS

International Search Report and Written Opinion for Application No. PCT/US20/54560 dated Dec. 18, 2020.

*Primary Examiner* — Abigail A Risic
(74) *Attorney, Agent, or Firm* — KDW Firm PLLC

(57) ABSTRACT

A damping system for a cable disposed within an upper pipe and a lower pipe includes a damper plate assembly connected to the upper pipe, a slider ring connected to and/or supported by the lower pipe, the slider ring having a hole in which the cable is arranged; and a shroud surrounding the damping system at a position where the upper pipe is adjacent to the lower pipe, such that the damper plate assembly and the slider ring are covered by the shroud. In such damping systems, the damper plate assembly and the slider ring are in contact with each other such that the transverse movement of the upper pipe relative to the lower pipe generates a frictional force to reduce an amplitude of the transverse movement of the upper pipe relative to the lower pipe.

30 Claims, 7 Drawing Sheets

(56) References Cited

U.S. PATENT DOCUMENTS

| | | | | |
|---|---|---|---|---|
| 2011/0302856 A1* | 12/2011 | Ebaugh | ............... | E01D 11/00 |
| | | | | 52/173.1 |
| 2018/0291983 A1 | 10/2018 | Brand et al. | | |
| 2023/0142377 A1* | 5/2023 | Brand | ............... | E01D 19/14 |
| | | | | 14/22 |
| 2023/0148435 A1* | 5/2023 | Brand | ............... | F16F 9/54 |
| | | | | 248/636 |
| 2023/0212831 A1* | 7/2023 | Mualla | ............... | E04B 1/98 |
| | | | | 14/22 |
| 2024/0392856 A1* | 11/2024 | Mao | ............... | F16F 7/10 |

\* cited by examiner

US 12,305,343 B2

IN-LINE DAMPING SYSTEMS AND METHODS

CROSS-REFERENCE TO RELATED APPLICATION

This application is a continuation of and claims priority to PCT/US2020/054560 filed Oct. 7, 2020, which claims priority to U.S. Provisional Patent Application Ser. No. 62/911,660, which was filed on Oct. 7, 2019, the disclosures of which are incorporated herein by reference in their entireties.

TECHNICAL FIELD

The subject matter disclosed herein relates to cable-stay bridges. In particular, the subject matter relates to vibration damping protective shield devices, systems, and associated methods of use and manufacture that reduce vibration and force transmission and motion along the cables of a cable-stay bridge.

BACKGROUND

Protection systems on cable stays include measures taken to prevent, for example, the effects of vandalism, terrorism attack, and/or fire. It may also include elements that protect the system from vehicle impacts, environmental effects, and/or to improve the service life of the cable stays of the bridge It is necessary to damp the movements and forces that can be transmitted along the lengths of the cable stays, which can lead to undesirable bridge stability dynamics, as well as to premature wear and failure of some bridge components. As such, the subject matter disclosed herein is directed towards a damping system, device, and method of use and/or manufacture to be integrally formed as a part of the protective cover of a cable stay.

SUMMARY

In one aspect, an example embodiment for a damping system for installation about a cable disposed within an upper pipe and a lower pipe is disclosed, the damping system comprising a damper plate assembly connected to the upper pipe; and a slider ring connected to and/or supported by the lower pipe, wherein the slider ring comprises a hole in which the cable is arranged; wherein the cable is coupled to the upper pipe, such that movement of the cable in a transverse direction, relative to an axial direction of the cable, causes a corresponding transverse movement of the upper pipe relative to the lower pipe; and wherein the damper plate assembly and the slider ring are in contact with each other such that the transverse movement of the upper pipe relative to the lower pipe generates a frictional force to reduce an amplitude of the transverse movement of the upper pipe relative to the lower pipe.

In some embodiments of the damping system, the cable comprises a plurality of individual cable strands to form a cable strand bundle.

In some embodiments, the damping system comprises a tension ring arranged about the cable strand bundle, within the upper pipe, to compress the cable strand bundle together.

In some embodiments of the damping system, the tension ring is attached to the upper pipe, such that the upper pipe and the cable strand bundle move substantially in unison.

In some embodiments of the damping system, the cable is movable in the axial direction within and/or relative to the upper pipe and/or the lower pipe.

In some embodiments of the damping system, a weight of the cable is transferred to the upper pipe to exert a normal force between the damper plate assembly and the slider ring, the normal force being used to generate the frictional force.

In some embodiments, the damping system comprises a shroud surrounding the damping system at a position where the upper pipe is adjacent to the lower pipe, such that the damper plate assembly and the slider ring are covered by the shroud.

In some embodiments of the damping system, the damper plate assembly comprises a support ring attached to an end of the upper pipe adjacent to the lower pipe and at least one friction pad arranged circumferentially and/or radially about a perimeter of the support ring to contact the slider ring to generate the frictional force to resist the transverse movement of the upper pipe relative to the lower pipe.

In some embodiments of the damping system, the support ring comprises a plurality of attachment cavities formed in a surface of the support ring that faces the slider ring when the support ring is attached to the upper pipe; a knuckle is secured within each of the plurality of attachment cavities; each knuckle comprises a pivot head on an end thereof adjacent to the slider ring; and each friction pad has a depression with a shape, or internal contour, corresponding to a shape, or external contour, of the pivot head, so that each friction pad is pivotable about the pivot head to ensure a contact surface of the friction pad remains parallel to, and in contact with, the slider ring, even when the support ring and the slider ring are not parallel with each other, or otherwise become inclined relative to each other.

In some embodiments, the damping system comprises, in each attachment cavity, a compression pad arranged between the knuckle and a bottom of the attachment cavity in which the knuckle is arranged, the compression pad being in contact with a surface of the knuckle opposite the pivot head. In such embodiments of the damping system, the knuckle comprises a knuckle retention cavity formed in an annular surface thereof; the knuckle is movably secured to the support ring by at least one knuckle retention pin that passes through the support ring and at least partially into the knuckle retention cavity; the knuckle retention cavity has a depth, in a direction of a depth of the attachment cavity, that defines, due to engagement of the knuckle retention pin within the knuckle retention cavity, a permissible deflection distance of the knuckle within the cavity of the support ring in which the knuckle is arranged; and the compression pad is compressed by a vertical movement of the knuckle within the cavity, thereby allowing the friction pad of one or more knuckles to be a different distance from the support ring in the axial direction when the support ring and the slider ring are not parallel with each other, or otherwise become inclined relative to each other.

In some embodiments of the damping system, the support ring extends radially out by a predetermined distance beyond an outer circumferential surface of the upper pipe, such that the support ring is configured to contact the shroud before the cable contacts the slider ring to limit transverse movement of the cable to prevent damage to the cable.

In some embodiments, the damping system comprises a shroud surrounding the damping system at a position where the upper pipe is adjacent to the lower pipe, such that the damper plate assembly and the slider ring are covered by the shroud, wherein the damping system can be visually inspected without removing the shroud, for example, by using an endoscope.

In some embodiments of the damping system, the transverse direction is defined within a plane that is substantially defined by the upper planar surface of the slider ring.

In some embodiments of the damping system, the frictional force is in a direction substantially opposite the transverse movement of the upper pipe relative to the lower pipe.

In another aspect, a cable-stay bridge comprising one or more of the damping systems of any of the damping systems described herein is disclosed.

In another aspect, an example embodiment for a damping system for installation about a cable disposed within an upper pipe and a lower pipe is disclosed, the damping system comprising a damper plate assembly connected to the upper pipe; a slider ring connected to and/or supported by the lower pipe, wherein the slider ring comprises a hole in which the cable is arranged; and a shroud surrounding the damping system at a position where the upper pipe is adjacent to the lower pipe, such that the damper plate assembly and the slider ring are covered by the shroud; wherein the cable is coupled to the upper pipe, such that movement of the cable in a transverse direction, relative to an axial direction of the cable, causes a corresponding transverse movement of the upper pipe relative to the lower pipe; and wherein the damper plate assembly and the slider ring are in contact with each other such that the transverse movement of the upper pipe relative to the lower pipe generates a frictional force to reduce an amplitude of the transverse movement of the upper pipe relative to the lower pipe.

In some embodiments of the damping system, the cable comprises a plurality of individual cable strands to form a cable strand bundle.

In some embodiments, the damping system comprises a tension ring arranged about the cable strand bundle, within the upper pipe, to compress the cable strand bundle together.

In some embodiments of the damping system, the tension ring is attached to the upper pipe, such that the upper pipe and the cable strand bundle move substantially in unison.

In some embodiments of the damping system, the cable is movable in the axial direction within and/or relative to the upper pipe and/or the lower pipe.

In some embodiments of the damping system, a weight of the cable is transferred to the upper pipe to exert a normal force between the damper plate assembly and the slider ring, the normal force being used to generate the frictional force.

In some embodiments of the damping system, the damper plate assembly comprises a support ring attached to an end of the upper pipe adjacent to the lower pipe and at least one friction pad arranged circumferentially and/or radially about a perimeter of the support ring to contact the slider ring to generate the frictional force to resist the transverse movement of the upper pipe relative to the lower pipe.

In some embodiments of the damping system, the support ring comprises a plurality of attachment cavities formed in a surface of the support ring that faces the slider ring when the support ring is attached to the upper pipe; a knuckle is secured within each of the plurality of attachment cavities; each knuckle comprises a pivot head on an end thereof adjacent to the slider ring; and each friction pad has a depression with a shape, or internal contour, corresponding to a shape, or external contour, of the pivot head, so that each friction pad is pivotable about the pivot head to ensure a contact surface of the friction pad remains parallel to, and in contact with, the slider ring, even when the support ring and the slider ring are not parallel with each other, or otherwise become inclined relative to each other.

In some embodiments, the damping system comprises, in each attachment cavity, a compression pad arranged between the knuckle and a bottom of the attachment cavity in which the knuckle is arranged, the compression pad being in contact with a surface of the knuckle opposite the pivot head. In such embodiments of the damping system, the knuckle comprises a knuckle retention cavity formed in an annular surface thereof; the knuckle is movably secured to the support ring by at least one knuckle retention pin that passes through the support ring and at least partially into the knuckle retention cavity; the knuckle retention cavity has a depth, in a direction of a depth of the attachment cavity, that defines, due to engagement of the knuckle retention pin within the knuckle retention cavity, a permissible deflection distance of the knuckle within the cavity of the support ring in which the knuckle is arranged; and the compression pad is compressed by a vertical movement of the knuckle within the cavity, thereby allowing the friction pad of one or more knuckles to be a different distance from the support ring in the axial direction when the support ring and the slider ring are not parallel with each other, or otherwise become inclined relative to each other.

In some embodiments of the damping system, the support ring extends radially out by a predetermined distance beyond an outer circumferential surface of the upper pipe, such that the support ring is configured to contact the shroud before the cable contacts the slider ring to limit transverse movement of the cable to prevent damage to the cable.

In some embodiments of the damping system, the damping system can be visually inspected without removing the shroud, for example, by using an endoscope.

In some embodiments of the damping system, the transverse direction is defined within a plane that is substantially defined by the upper planar surface of the slider ring.

In some embodiments of the damping system, the frictional force is in a direction substantially opposite the transverse movement of the upper pipe relative to the lower pipe.

In another aspect, an example embodiment of a method of damping movement and/or vibration of a cable disposed within an upper pipe and a lower pipe is disclosed. The method comprises connecting a damper plate assembly to the upper pipe; connecting a slider ring to the lower pipe, wherein the slider ring comprises a hole in which the cable is arranged; coupling the cable to the upper pipe, such that movement of the cable in a transverse direction, relative to an axial direction of the cable, causes a corresponding transverse movement of the upper pipe relative to the lower pipe; arranging the upper pipe and the lower pipe such that the damper plate assembly and the slider ring contact each other; and moving the upper pipe in the transverse direction relative to the lower pipe to generate a frictional force to reduce an amplitude of the transverse movement of the upper pipe relative to the lower pipe.

In some embodiments of the method, the cable comprises a plurality of individual cable strands to form a cable strand bundle.

In some embodiments, the method comprises compressing, using a tension ring arranged about the cable strand bundle, within the upper pipe, the cable strand bundle together.

In some embodiments of the method, the tension ring is attached to the upper pipe, such that the upper pipe and the cable strand bundle move substantially in unison.

In some embodiments of the method, the cable is movable in the axial direction within and/or relative to the upper pipe and/or the lower pipe.

In some embodiments, the method comprises transferring a weight of the cable to the upper pipe to exert a normal force between the damper plate assembly and the slider ring, the normal force being used to generate the frictional force.

In some embodiments, the method comprises attaching a shroud about the upper pipe and the lower pipe, such that the damper plate assembly and the slider ring are covered by the shroud.

In some embodiments of the method, the damper plate assembly comprises a support ring attached to an end of the upper pipe adjacent to the lower pipe and at least one friction pad arranged circumferentially and/or radially about a perimeter of the support ring to contact the slider ring to generate the frictional force to resist the transverse movement of the upper pipe relative to the lower pipe.

In some embodiments, the method comprises: forming a plurality of attachment cavities in a surface of the support ring that faces the slider ring when the support ring is attached to the upper pipe; securing a knuckle within each of the plurality of attachment cavities, each knuckle comprising a pivot head on an end thereof adjacent to the slider ring; and forming, in each friction pad, a depression with a shape, or internal contour, corresponding to a shape, or external contour, of the pivot head, so that each friction pad is pivotable about the pivot head to ensure a contact surface of the friction pad remains parallel to, and in contact with, the slider ring, even when the support ring and the slider ring are not parallel with each other, or otherwise become inclined relative to each other.

In some embodiments, the method comprises arranging, in each attachment cavity, a compression pad between the knuckle and a bottom of the attachment cavity in which the knuckle is arranged, the compression pad being in contact with a surface of the knuckle opposite the pivot head. In such embodiments of the method, the knuckle comprises a knuckle retention cavity formed in an annular surface thereof; the knuckle is movably secured to the support ring by at least one knuckle retention pin that passes through the support ring and at least partially into the knuckle retention cavity; the knuckle retention cavity has a depth, in a direction of a depth of the attachment cavity, that defines, due to engagement of the knuckle retention pin within the knuckle retention cavity, a permissible deflection distance of the knuckle within the cavity of the support ring in which the knuckle is arranged; and the compression pad is compressed by a vertical movement of the knuckle within the cavity, thereby allowing the friction pad of one or more knuckles to be a different distance from the support ring in the axial direction when the support ring and the slider ring are not parallel with each other, or otherwise become inclined relative to each other.

In some embodiments of the method, the support ring extends radially out by a predetermined distance beyond an outer circumferential surface of the upper pipe, such that the support ring contacts the shroud before the cable contacts the slider ring to limit transverse movement of the cable to prevent damage to the cable.

In some embodiments of the method, the transverse direction is defined within a plane that is substantially defined by the upper planar surface of the slider ring.

In some embodiments of the method, the frictional force is in a direction substantially opposite the transverse movement of the upper pipe relative to the lower pipe.

In some embodiments, the method comprises attaching a shroud about the upper pipe and the lower pipe, such that the damper plate assembly and the slider ring are covered by the shroud; and visually inspecting at least one or more of the damper plate assembly and the slider ring without removing the shroud.

In some embodiments of the method, the transverse direction is defined within a plane that is substantially defined by the upper planar surface of the slider ring.

In another aspect, an example embodiment of a method of damping movement and/or vibration of a cable disposed within an upper pipe and a lower pipe is disclosed. The method comprises connecting a damper plate assembly to the upper pipe; connecting a slider ring to the lower pipe, wherein the slider ring comprises a hole in which the cable is arranged; attaching a shroud about the upper pipe and the lower pipe, such that the damper plate assembly and the slider ring are covered by the shroud; coupling the cable to the upper pipe, such that movement of the cable in a transverse direction, relative to an axial direction of the cable, causes a corresponding transverse movement of the upper pipe relative to the lower pipe; arranging the upper pipe and the lower pipe such that the damper plate assembly and the slider ring contact each other; and moving the upper pipe in the transverse direction relative to the lower pipe to generate a frictional force to reduce an amplitude of the transverse movement of the upper pipe relative to the lower pipe. In some embodiments of the method, the cable comprises a plurality of individual cable strands to form a cable strand bundle.

In some embodiments, the method comprises compressing, using a tension ring arranged about the cable strand bundle, within the upper pipe, the cable strand bundle together.

In some embodiments of the method, the tension ring is attached to the upper pipe, such that the upper pipe and the cable strand bundle move substantially in unison.

In some embodiments of the method, the cable is movable in the axial direction within and/or relative to the upper pipe and/or the lower pipe.

In some embodiments, the method comprises transferring a weight of the cable to the upper pipe to exert a normal force between the damper plate assembly and the slider ring, the normal force being used to generate the frictional force.

In some embodiments of the method, the damper plate assembly comprises a support ring attached to an end of the upper pipe adjacent to the lower pipe and at least one friction pad arranged circumferentially and/or radially about a perimeter of the support ring to contact the slider ring to generate the frictional force to resist the transverse movement of the upper pipe relative to the lower pipe.

In some embodiments, the method comprises: forming a plurality of attachment cavities in a surface of the support ring that faces the slider ring when the support ring is attached to the upper pipe; securing a knuckle within each of the plurality of attachment cavities, each knuckle comprising a pivot head on an end thereof adjacent to the slider ring; and forming, in each friction pad, a depression with a shape, or internal contour, corresponding to a shape, or external contour, of the pivot head, so that each friction pad is pivotable about the pivot head to ensure a contact surface of the friction pad remains parallel to, and in contact with, the slider ring, even when the support ring and the slider ring are not parallel with each other, or otherwise become inclined relative to each other.

In some embodiments, the method comprises arranging, in each attachment cavity, a compression pad between the knuckle and a bottom of the attachment cavity in which the knuckle is arranged, the compression pad being in contact with a surface of the knuckle opposite the pivot head. In such embodiments of the method, the knuckle comprises a knuckle retention cavity formed in an annular surface thereof; the knuckle is movably secured to the support ring by at least one knuckle retention pin that passes through the support ring and at least partially into the knuckle retention cavity; the knuckle retention cavity has a depth, in a direction of a depth of the attachment cavity, that defines, due to engagement of the knuckle retention pin within the knuckle retention cavity, a permissible deflection distance of the knuckle within the cavity of the support ring in which the knuckle is arranged; and the compression pad is compressed by a vertical movement of the knuckle within the cavity, thereby allowing the friction pad of one or more knuckles to be a different distance from the support ring in the axial direction when the support ring and the slider ring are not parallel with each other, or otherwise become inclined relative to each other.

In some embodiments of the method, the support ring extends radially out by a predetermined distance beyond an outer circumferential surface of the upper pipe, such that the support ring contacts the shroud before the cable contacts the slider ring to limit transverse movement of the cable to prevent damage to the cable.

In some embodiments of the method, the transverse direction is defined within a plane that is substantially defined by the upper planar surface of the slider ring.

In some embodiments of the method, the frictional force is in a direction substantially opposite the transverse movement of the upper pipe relative to the lower pipe.

In some embodiments, the method comprises visually inspecting at least one or more of the damper plate assembly and the slider ring without removing the shroud.

In some embodiments of the method, the transverse direction is defined within a plane that is substantially defined by the upper planar surface of the slider ring.

DETAILED DESCRIPTION

Figure 1A:
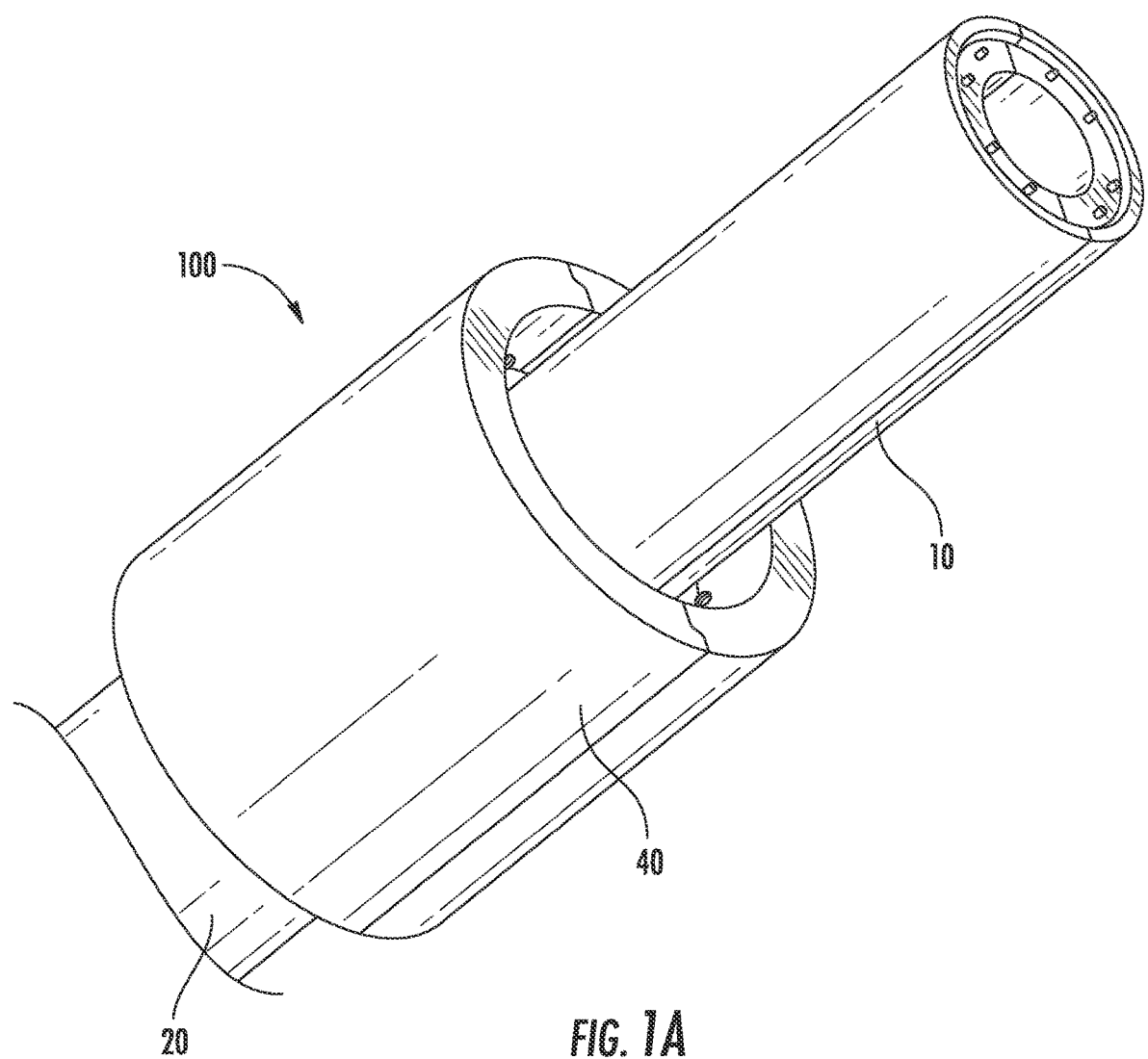
FIG. 1A is an external view of a cable stay damping system according to a first example embodiment.

The presently disclosed subject matter is directed towards damping devices and/or systems that can be provided along, for example, a cable stay of a bridge, or any other suitable longitudinally extending element for which it would be advantageous to provide damping. In some embodiments, such damping devices and/or systems can be integrated into a protection system for such a cable stay. The presently disclosed subject matter is further directed towards methods of damping a longitudinally-extending structure, such as, for example and without limitation, a cable stay for a bridge. Such cable stays can comprise a cable strand bundle. It is common for such cable strand bundles to be covered, at least partially, along their respective lengths by a pipe, which can be segmented from a plurality of pipes to include an upper pipe and a lower pipe. As the term is used herein, a pipe can include a component part that encompasses the cable strand bundle (e.g., having a length that is greater than the cross-sectional area by at least a factor of five, ten, or more).

It will be understood by those having ordinary skill in the art that these systems, devices, and methods can be implemented in other similar applications without deviating from the scope of the subject matter disclosed herein. These systems, devices, and methods provide damping aspects into the protection systems of a cable stay support system. The damping system is configured to dissipate energy from the cable stay when the cable stay is vibrating. It can be advantageous to integrate the damping aspects into the protection system for the cable stay, as this allows for the weight of the components of the protection system, in addition to the weight of the cable stay itself, to be used to generate a compressive normal force between components of the damping system to cause a frictional damping force between components of the damping system.

Depending on individual application-specific requirements, the type of energy dissipating component can vary. The advantages achieved via the integration of the damping aspects into the cable stay protection system include, for example and without limitation, that damper adjustability can be directly comparable with the protection system movement capacity; that the damper remains in-line with the cable stay and does not interfere with bridge aesthetics; that the installation of the damping aspects can be achieved much more quickly and efficiently than conventionally-known damping systems for cable stays; and that the maintenance and operations of the bridge are reduced and simplified during the service life of the bridge. The maintenance and operational advantages are achieved by, for example and without limitation, the damper system having no direct exposure to the environment; that the internal components of the damping system are physically shielded from external access due to their being integrated within, and protected by, the cable stay protection system; and that the damping system has minimal parts that experience wear and tear (e.g., due to frictional contact therebetween) during operation of the damping system.

FIG. 1A shows an external isometric view of a damping system, generally designated 100 (e.g., a friction damping system) that is integral to the protection system of a cable stay, which includes at least an upper pipe 10, a lower pipe 20, and a shroud 40. Non-limiting examples of such pipes (e.g., for the upper pipe 10 and/or the lower pipe 20) can include a guide pipe, an anti-vandalism pipe, a terrorist protective armor pipe, an HDPE protective pipe, and any combinations thereof. The damping system 100 is integrated at the interface between the upper pipe 10 and lower pipe 20, within the shroud 40. The damping system 100 disclosed herein provides high performance even for extreme cases or where the damper has to be placed close (e.g., installed within 25%, 20%, 15%, 10%, 5%, or even 1% of the overall cable length) to the deck anchorage, relative to the overall length of the cable stay.

Figure 1B:
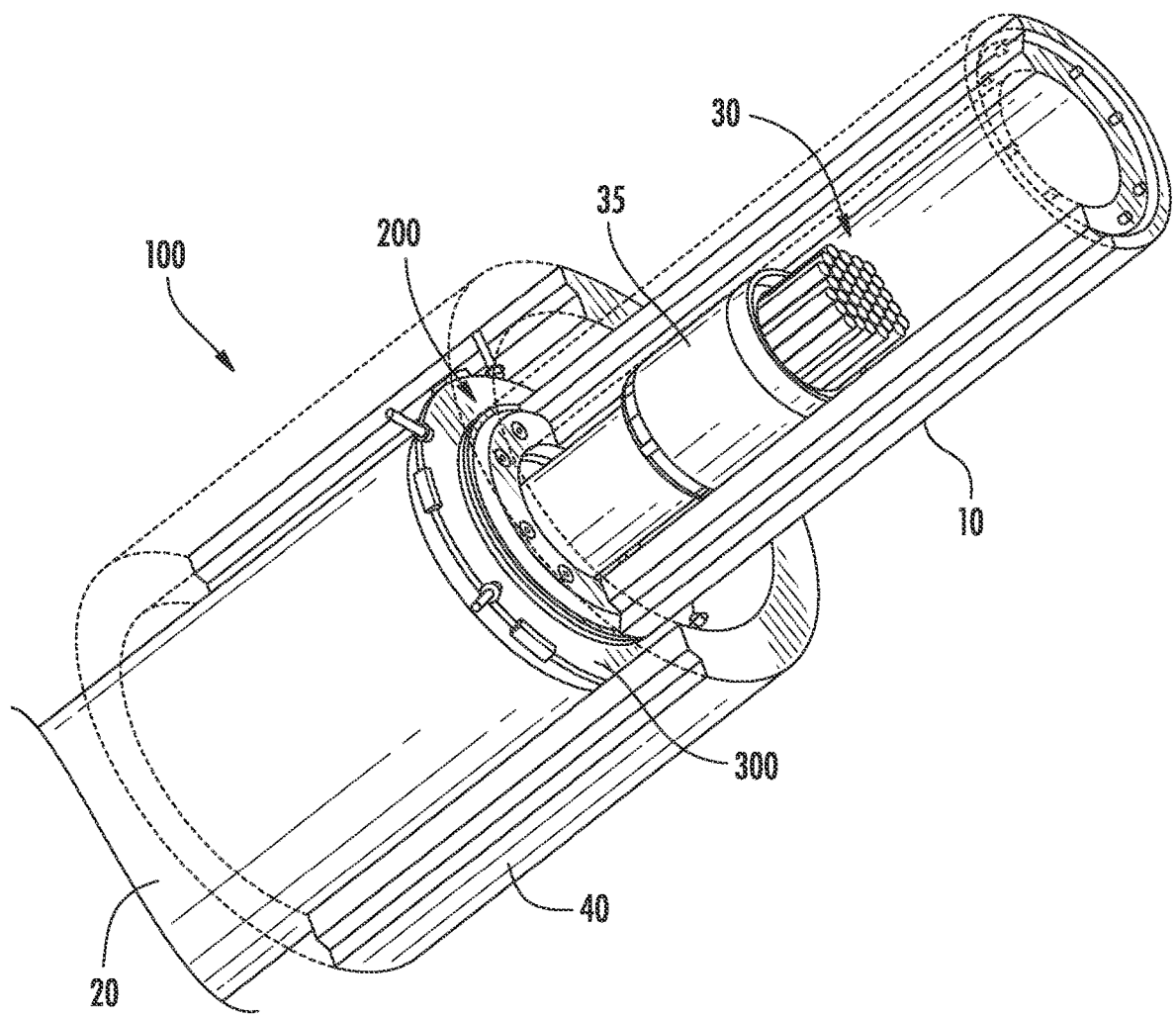
FIG. 1B is a sectional view of the example cable stay damping system shown in FIG. 1A.

FIG. 1B is a partial sectional view, showing the internal components of the damping system of FIG. 1A. In the first example embodiment shown, the cable stay, generally designated 30, comprises a plurality of individual cable strands that are compressed together by a tension ring 35 to form a cable strand bundle. While the damping system 100 is shown in the example embodiments disclosed herein as being used on a cable stay 30 comprised of a bundle of individual cable strands, or filaments, that form a cable strand bundle, the term "cable stay" as used herein can include any suitably longitudinally-extending member. The cable stay 30 passes from the upper pipe 10, which protects the upper portion of the cable stay 30, to the lower pipe 20, which is connected at and/or adjacent to the bridge deck (e.g., the transport surface) and protects the cable stay 30 between the point where the cable stay 30 is connected to the bridge deck and the damping system 100 (e.g., at shroud 40). The tension ring 35 couples the individual strands of the cable stay 30 to the upper pipe 10, such that relative movement between the upper pipe 10 and the cable stay 30 in the radial direction is substantially entirely prevented, such that the upper pipe 10 and the cable stay 30 move in unison. The shroud 40 is provided radially about the location where the upper pipe 10 and the lower pipe 20 terminate at the damping system 100.

The damping system 100 comprises a slider ring 300, which is connected to and/or supported by the lower pipe 20, and a damper plate assembly, generally designated 200, which is connected to the upper pipe 10. The term "pipe" can also be used to refer to a component part (e.g., of a protection system) that does not fully enclose the cable strand bundle 30, but is still designed so as to apply a weight (e.g., a normal force) at a frictional surface (e.g., at the slider ring 300) of the damping system 100 to generate the frictional force between the damper plate assembly 200 and the slider ring 300 to dampen the relative movements (e.g., those movements in the plane defined by the contact surface of the slider ring 300) therebetween. As such, the term "pipe" used herein may encompass a device that would not necessarily be considered to be commensurate with the conventional definition of the word "pipe."

Since the cable stay bundle 300 is coupled to the upper pipe 10, to which the damper plate assembly 200 is also coupled, the weight of the cable stay bundle 300 is transferred to the upper pipe 10 to apply a normal force between the damper plate assembly 200 and the slider ring 300. Due to the normal force applied between the damper plate assembly 200 and the slider ring 300, any relative radial movement between the upper pipe 10 (e.g., including the cable stay bundle 300) and the lower pipe 20 will cause a frictional sliding of the components of the damper plate assembly 200 against the contact surface of the slider ring 300 against which the components of the damper plate assembly 200 are in contact, thereby generating a frictional force in the radial direction of the cable stay bundle 300 that counteracts the forces inducing the relative movement (e.g., radial movement) between the upper pipe 10 and the lower pipe 20, thereby reducing an amplitude and/or frequency of the movement of the cable stay bundle 300 compared to an undamped cable stay protection system. In some embodiments, a vibration is induced in the cable stay bundle 300 during normal use.

Due to the compliant nature of the contact between the damper plate assembly 200 and the slider ring 300, the vibration (e.g., of the cable stay bundle 300) is damped and is not transmitted, or is at least significantly (e.g., by more than 50%, more than 75%, more than 90%, more than 95%, or more than 99%) attenuated, so that only a small amplitude vibration is transmitted to the bridge deck and/or support surface. The converse is also provided by such damping systems 100 as are disclosed herein, such that vibrations from the bridge deck and/or support surface are attenuated (e.g., by more than 50%, more than 75%, more than 90%, more than 95%, or more than 99%) by the damping system 100 as well, such that vibrations induced in the vibration. Such vibrations as are disclosed herein as being attenuated can be induced by, for example, the speed and/or direction of and air flow (e.g., wind), the number, speed, and/or directions of vehicles on the supported structure, seismic events (e.g., earthquakes). and other dynamic forces applied to the bridge and the cable stays thereof.

Figure 1C:
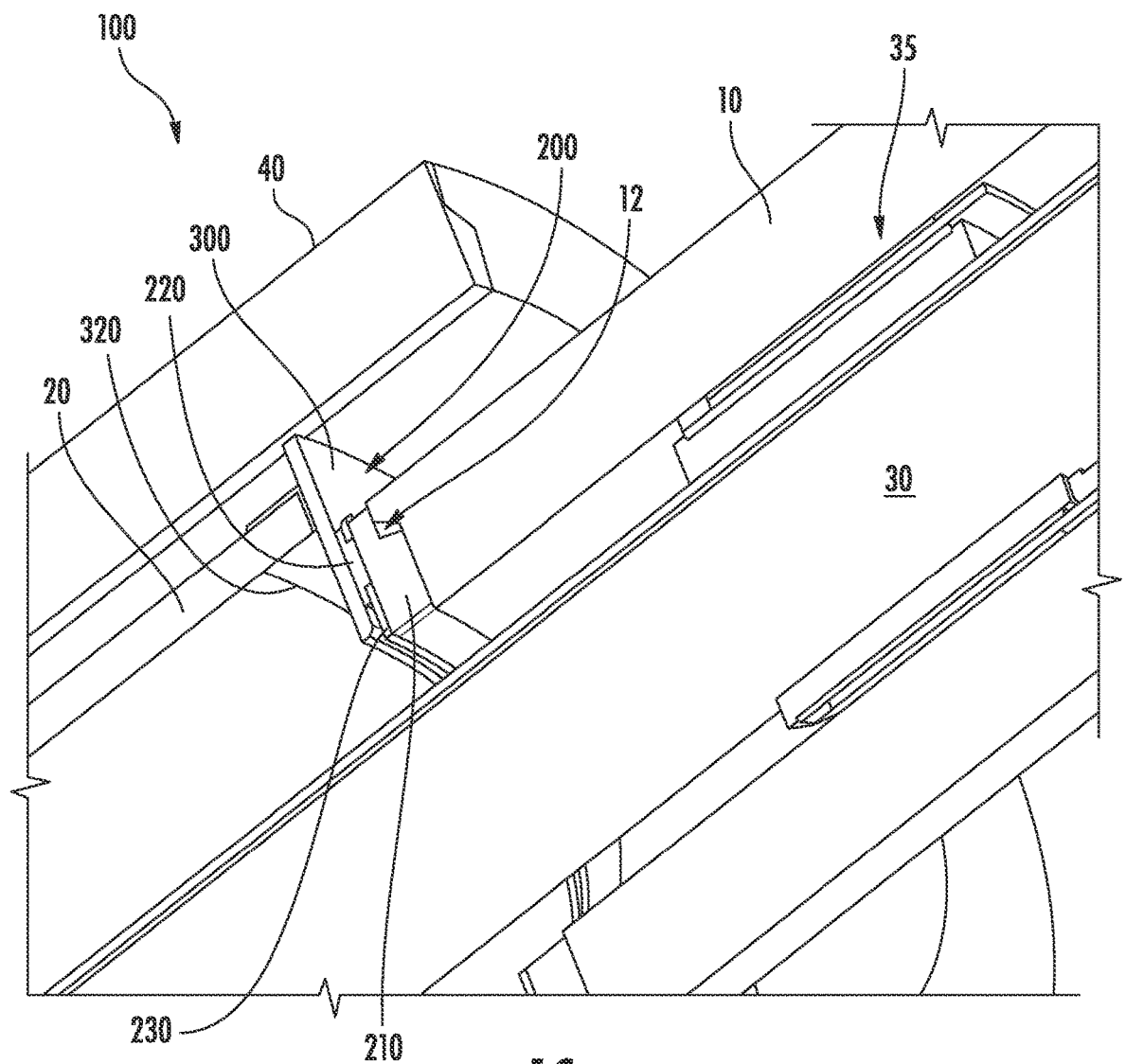
FIG. 1C is a detailed sectional view of the example cable stay damping system shown in FIGS. 1A and 1B.

FIG. 1C shows further aspects of the first embodiment of the damper system 100 shown in FIGS. 1A and 1B. As shown, the damper plate assembly 200 has a plurality of friction pads 220 positionally (e.g., radially and circumferentially) secured about the perimeter of the upper pipe 10 by a mechanical stopper plate 230, which positionally locates the friction pads 220 to prevent relative radial and/or circumferential movement of any of the friction pads 220 relative to the perimeter of the upper pipe 10. The mechanical stopper plate 230 also limits the axial movement of the overall damping system 100, as can be seen in FIG. 10 by the protrusion of the mechanical stopper plate 230 that extends radially beyond the bumper 210 and/or the outer circumference of the upper pipe 10. In some embodiments, this protrusion of the mechanical stopper plate 230 can extend in the radial direction to reduce a permitted degree of transverse movement between the upper pipe 10 and the shroud 40 and/or the lower pipe 20. The friction pads 220 can be made from any suitably durable material, including, for example, high density polyethylene (HDPE). In some embodiments, each friction pad 220 can be a substantially continuous annular ring that contacts the slider ring 300, advantageously such that all, or substantially all, of a surface of each friction pad 220 is in frictional contact with the contact surface of the slider ring 300.

The mechanical stopper plate 230 is connected to the upper pipe 10 by a bumper 210, which comprises a compliant material (e.g., a viscoelastic material or ultra high molecular weight (UHMW) material). The slider ring 300 is supported by and positioned on, or otherwise attached to, the upper end of the lower pipe 20 by a slider ring guide 320, which is in the form of an annular channel that slides over the end of the lower pipe 20 adjacent to the damping system 100. In some embodiments, the slider ring 300 cannot be vertically displaced relative to the lower pipe (e.g., in the axial, or longitudinal, direction of the lower pipe 20 and/or the cable stay bundle 30) after the installation of the slider ring 300 onto the lower pipe 20. Therefore, the normal force applied (e.g., due to the weight of the upper pipe 10 and/or portion of the cable stay bundle 30 above the damping system 100) between the damper plate assembly 200 and the slider ring 300 will cause a frictional interface between one or more (e.g., all) of the friction pads 220 and the surface of the slider ring 300 in contact with the friction pad(s) 220 to resist relative movements in the transverse, or radial, direction between the friction pads 220 and, consequently, also the upper pipe 10 and/or the cable stay bundle 30 to which the friction pads 220 are rigidly attached, and the slider ring 300 and, consequently, also the lower pipe 20 to which the slider ring 300 is rigidly attached.

In some embodiments, one or more of the friction pads 220 can be a softer material than that of the slider ring 300. In some embodiments, the friction pad 220 can be in the form of a substantially continuous annular structure (e.g., including an entirely continuous structure and also a structure having a slot to allow for the friction pad 220 to be installed about the cable stay bundle 30 without requiring the cable stay bundle 30 to be disconnected at either end from the supported structure). In some embodiments, the friction pad 220 can be a segmented annular structure such that a plurality of friction pads 220 are secured to the upper pipe 10 by the mechanical stopper plate 230 to form a generally annular structure (e.g., including embodiments in which the segments of the annular structure are spaced apart from each other in the circumferential and/or radial directions and/or embodiments in which the segments of the annular structure are abutted against each other such that there is substantially no gap present between adjacent segments of the annular structure). As used herein, the terms "transverse," "circumferential," and/or "radial" direction(s) are defined as being in a plane that is substantially defined by the upper planar surface of the slider ring 300, which is the surface at which the normal force and/or the frictional force is/are generated. In some embodiments, the upper surface of the slider ring 300 may have a non-planar surface and the bumper 210 and/or the friction pad(s) 220 may be formed to have a similarly non-planar surface to maintain a substantially continuous contact surface between the slider ring 300 and the friction pad(s) 220.

Figure 2:
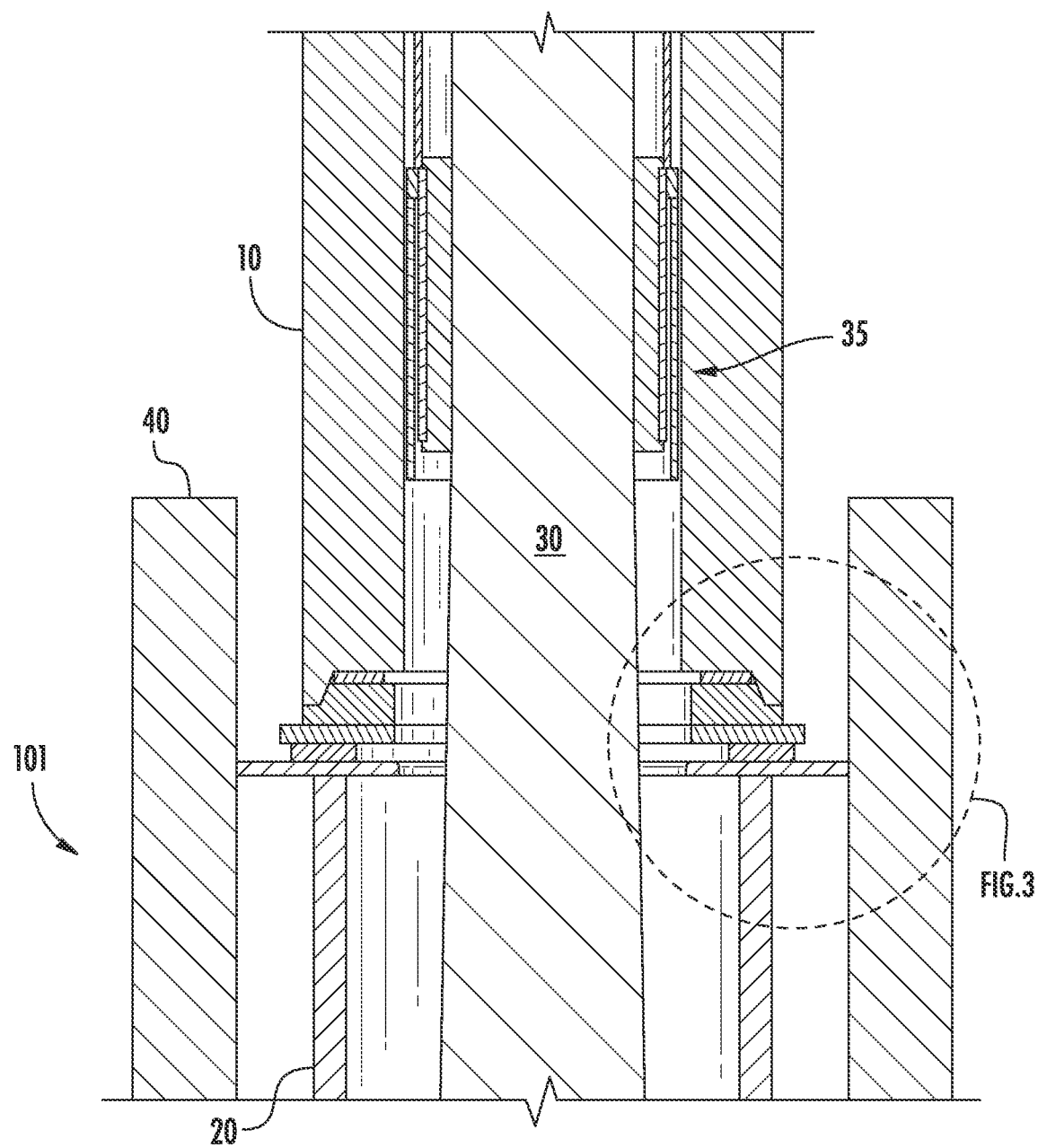
FIG. 2 is a side cross-sectional view of a cable stay damping system according to a second example embodiment.
Figure 3:
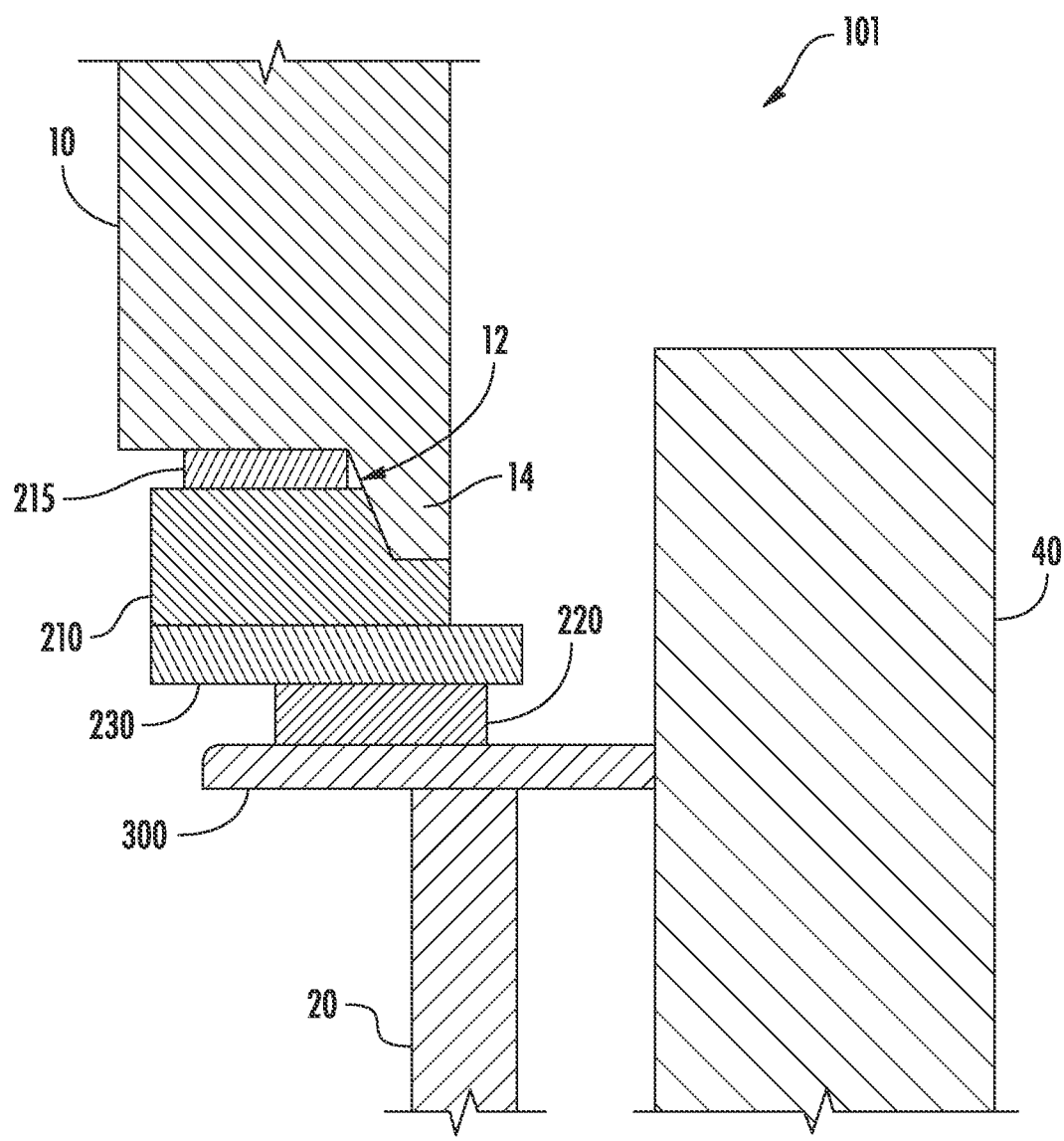
FIG. 3 is a detailed side cross-sectional view of the example cable stay damping system of FIG. 2.

FIGS. 2 and 3 show a second example embodiment of a damping system, generally designated 101, suitable for use in damping vibration and/or translatory movements of a longitudinally-extending structure, such as a structural element under tension. One non-limiting example of such a structural element is a cable stay for use in supporting a cable stay bridge. Many of the structures shown in FIGS. 2 and 3 are substantially similar to those described in the example embodiment shown in FIGS. 1A-1C. As shown in FIG. 2, a longitudinally-extending cable stay bundle 30 is coupled at a tension ring, generally designated 35, to an upper pipe 10, within which the cable stay bundle 30 is generally concentrically arranged. The tension ring 35 is configured to radially compress the individual strands of the cable stay bundle 30 together so that the cable stay bundle 30 moves as a generally unitary and/or monolithic structure, rather than as a loose bundle of individual cable strands. The cable stay bundle 30 passes through the damping system 101 and into and/or through a lower pipe 20, which is arranged generally concentrically around the cable stay bundle 30. A shroud 40 is attached concentrically about the exterior of the upper pipe 10 and/or the lower pipe 20. In some embodiments, the shroud 40 is connected to the outer pipe 20 by a portion of the damping system 101 itself (e.g., at slider ring 300).

The damping system 101 has a bumper 210, which is connected to the upper pipe 10 by a connector plate 215. The upper pipe 10 has an axially-extending flange element 14 that forms a cavity, generally designated 12, in which the connector plate 215 and at least a portion of the bumper 210 are arranged. The flange element 14 of the upper pipe 10 advantageously prevents transverse (e.g., radial) displacement of the bumper 210 relative to the upper pipe 10 during use. The bumper 210 and the flange element 14 advantageously have a substantially similar outer profile shape to minimize any gap between the inner surface of the flange element 14 and the outer surface of the bumper 210. The bumper 210 can be formed from substantially any suitable material, as described in the example embodiment shown in FIGS. 1A-1C. The damping system 101 has a mechanical stopper plate 230 rigidly attached (e.g., bonded) to the bumper 210. One or more friction pads 220 are attached to the mechanical stopper plate 230. The friction pad(s) 220 can have any suitable shape; the friction pad(s) 220 and the mechanical stopper plate 230 can be substantially similar to any of the example embodiments disclosed herein for a damping system. As was described in damping system 100, the friction pad(s) 220 contact an upper surface of the slider ring 300 affixed to the lower pipe 20 and, due to a normal force exerted by the weight of the upper pipe 10 and/or the cable stay bundle 30, or a portion thereof, generates a frictional force to resist any transverse movements of the upper pipe 10 relative to the lower pipe 20.

Figure 4:
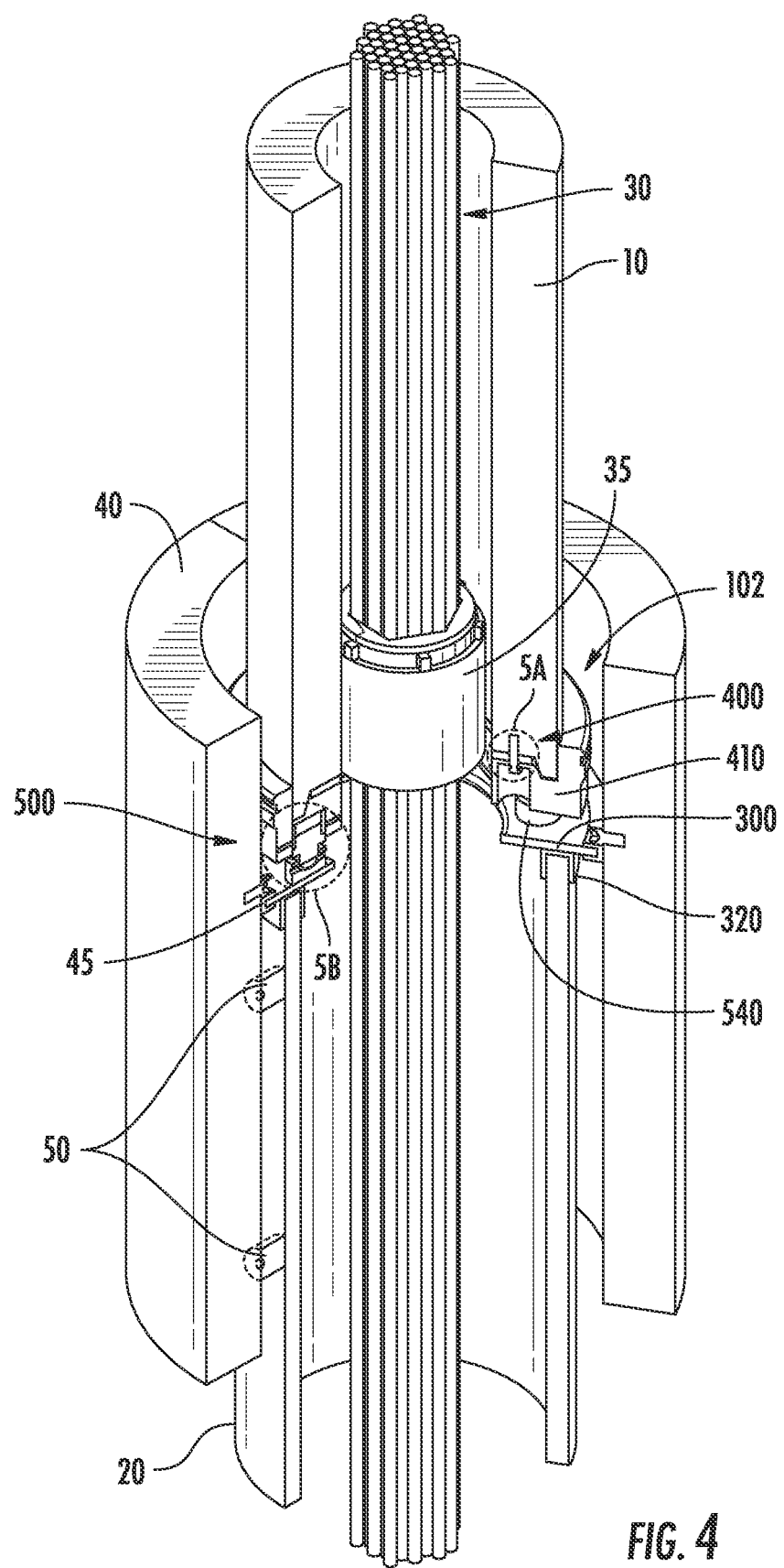
FIG. 4 is a partial sectional view of a cable stay damping system according to a third example embodiment.
Figure 5A:
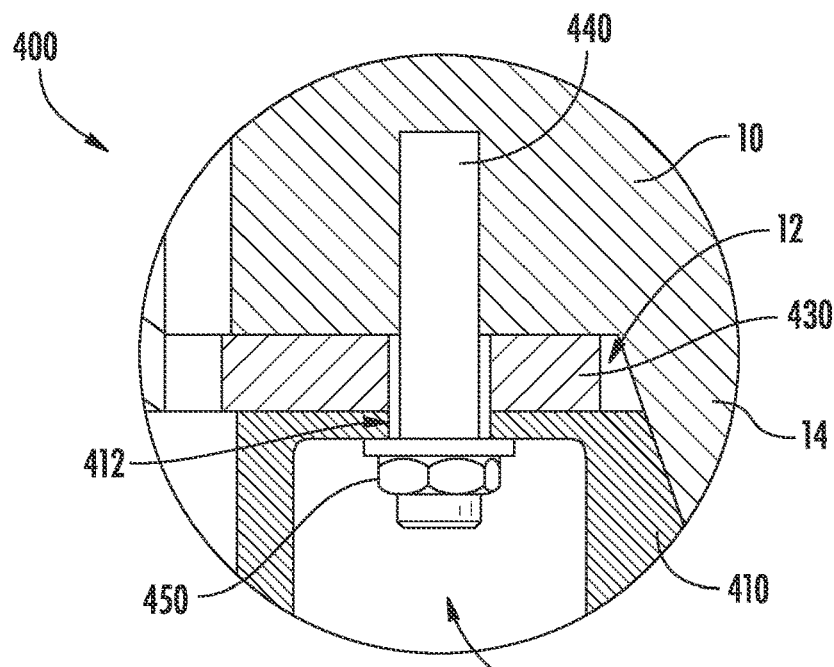
FIG. 5A is a detailed cross-sectional view of an attachment portion of the example cable stay damping system of FIG. 4.
Figure 5B:
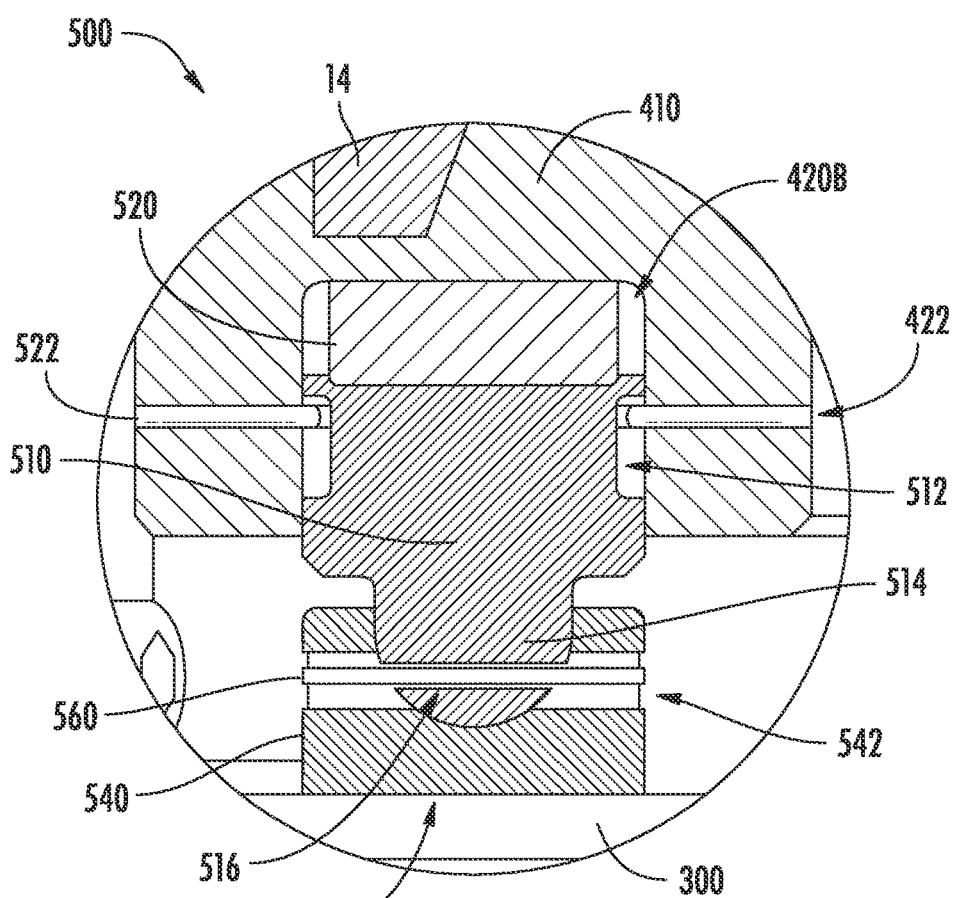
FIG. 5B is a detailed cross-sectional view of a damping portion of the example cable stay damping system of FIG. 4.

FIG. 4 shows a third example embodiment of a damping system, generally designated 102, that is integrated into a cable protection system. Like elements to those described in the first embodiments shown in FIGS. 1A-3 may not be repeated herein but are nevertheless identical. A support ring 410 is rigidly affixed to the end of the upper pipe 10 that is adjacent an end of the lower pipe 20. Various aspects of the installation region, generally designated 400, of the support ring 410 are shown in FIG. 5A, which will be described further elsewhere herein. A plurality of friction pads 540 are arranged radially about, and attached to the underside of, the support ring 410. The friction pads 540 are arranged to be in contact with, and generate a frictional contact force against, the slider ring 300. Various aspects of the attachment region, generally designated 500, for the attachment of the friction pads 540 to the support ring 410 are shown in FIG. 5B, which will be described further elsewhere herein. The slider ring 300 is connected to the lower pipe 20 by the slider ring guide 320, as was shown and described regarding the embodiments shown in FIGS. 1A-3. The shroud 40 is advantageously, in the embodiment shown, a multi-part element that is assembled together about the outer circumference of the upper pipe 10 and the lower pipe 20 to protect the damping system 102 from external effects. The shroud 40 is positionally fixed to the lower pipe 20 by the shroud guide 45, which secures the shroud 40 to the slider ring 300 and, accordingly, the lower pipe 20, in a substantially fixed position along the longitudinal direction of the cable stay bundle 30. The shroud 40 is radially spaced apart from the lower pipe 20 by a shroud centering device, which can include, for example and without limitation, stand-off elements 50 to ensure a desired spacing between the inner surface of the shroud 40 and the outer surface of the lower pipe 20 to prevent a direct contact therebetween.

As shown in FIG. 5A, the support ring 410 is rigidly attached to the upper pipe 10. In the example embodiment shown, the upper pipe 10 has a fastener 440, which can be a threaded longitudinally extending element (e.g., a helically threaded shaft), embedded within the end thereof. The support ring 410 has a plurality of installation cavities 420A formed radially thereabout, the positions of the installation cavities 420A corresponding to the radial positions at which the fastener are provided circumferentially about the end of the upper pipe 10 against which the support ring 410 is configured for attachment. During assembly of the support ring 410 to the upper pipe 10, the fastener 440 is inserted through, so as to extend through, holes 412 formed in the support ring 412 to allow an exposed end of the fastener 440 (e.g., the end of the fastener 440 not captive within the end of the upper pipe 10) to extend within a corresponding one of the installation cavities 420A. A retaining fastener 450 (e.g., a complementarily threaded nut or rivet head) is secured onto the end of each fastener 440 of the upper pipe 10, thereby securing the support ring 410 to the upper pipe 10. Each installation cavity 420A is sized adequately to allow for installation tools (e.g., a socket and/or wrench) to be accommodated therein to aid in assembly of the damping system 102.

As was described in the example embodiment shown in FIGS. 2 and 3, the end of the upper pipe 10 adjacent to the damping system 102 has a flange element 14 that protrudes in the axial direction of the upper pipe 10 from the radially outer circumferential edge to define a cavity 12 into which the support ring 410 and the connector plate 430 are inserted. While the cavity 12 is shown as being on the radially inner face of the flange element 14, in some embodiments the flange element 14 extends from the radially inner circumferential edge, such that the cavity is defined on the radially outer face of the flange element 14.

FIG. 5B shows aspects of how the friction pads 540 are secured to the support ring 410 during assembly and operation of the damping system 102. The support ring 410 has, associated with and formed at a position where each friction pad 540 is designated for installation circumferentially and/or radially about the support ring 410, an attachment cavity 420B. As such, one or more (e.g., a plurality of) such attachment cavities 420B are formed about (e.g., partially through) the support ring 410. A knuckle 510 is installed within each of the attachment cavities 420B. The knuckle 510 can be made from a suitably durable and hard material that it is substantially incompressible during operation of the damping system 102. The knuckle 510 is secured within the attachment cavity 420B by at least one knuckle retention pin 522, which extends through a knuckle retention slot 422 formed at least through a portion of the support ring 410 to secure each knuckle 510 within the corresponding attachment cavity 420B of the support ring 410.

The knuckle 510 has a knuckle retention cavity, generally designated 512, formed about at least a portion thereof (e.g., to have a generally annular shape) to allow for the knuckle 510 to be axially displaced within the attachment cavity 420B during operation to accommodate non-perpendicular arrangements of the damper plate assembly 200 and the slider ring 300 during operation of the damping system 102. A knuckle retention slot is formed through the support ring, into one or more of which one or more of the knuckle retention pin(s) 522 are inserted, such that a distal end of the knuckle retention pin 522 is located within the knuckle retention cavity 512 to secure the knuckle 510 within the attachment cavity 420B. The depth (e.g., in the axial direction of the cable stay bundle, which is the vertical direction, as FIG. 5B is illustrated) of the knuckle retention cavity 512 in the longitudinal direction defines the permissible deflection of the knuckle 510 within the attachment cavity 420B of the support ring 410. In the embodiment shown, the knuckle 510 is shown secured within the attachment cavity 420B by two knuckle retention pins 522, each of which is inserted through a corresponding knuckle retention slot 422, which can be formed, for example, through the radially inner and outer surfaces of the support ring. In some embodiments, the knuckle retention slots 422 are coaxial and/or coplanar with each other.

A compression pad 520, which can be any suitably deformable material, including, for example, a viscoelastic material, is provided within the attachment cavity 420B to provide for compliance in the axial direction of the attachment cavity 420B (e.g., in the vertical direction, as shown in FIG. 5B), thereby allowing the knuckle 510 to move axially within the attachment cavity 420B and also exerting a normal force on the knuckle 510, generally coaxial with the axial direction of the attachment cavity 420B, and consequently on the friction pad 540. The depth of the knuckle retention cavity 512 is selected according to the material selected for the compression pad 520. For example, the depth of the knuckle retention cavity 512 may be greater for damping systems 102 having a compression pad 520 that is made of a comparatively softer (e.g., having a lower spring, or deformation, rate) material than a damping system 102 having a compression pad 520 made of a comparatively harder (e.g., having a higher spring, or deformation, rate) material.

The knuckle 510 has a pivot head 514 formed at the surface thereof closest to the slider ring 300. The friction pad 540 has a corresponding depression formed in the surface thereof that faces away from the slider ring 300, into which the pivot head 514 is inserted. The pivot head 514 and the depression each have a corresponding substantially hemispherical-shape to allow the friction pad 540 to rotate about the pivot head 514 to ensure that the contact surface of the friction pad 540 is always parallel to, and in contact with, the contact surface of the slider ring 300. The friction pad 540 has a friction pad retention slot, generally designated 542, formed therethrough, advantageously in a plane that is substantially parallel to the contact surface of the friction pad 540. The knuckle 510 has a knuckle retention slot 514 formed through the pivot head 514, such that, when the friction pad 540 is installed over the pivot head 540, the friction pad retention slot 542 is coplanar to the knuckle retention slot 516, thereby allowing the passage of the friction pad retaining pin 560 through the friction pad retention slot 542 and the knuckle retention slot 516 to secure the friction pad 540 to the pivot head 514. The diameter of the friction pad retention slot 542 may be larger than for the knuckle retention slot 516 to allow the friction pad 540 to pivot about the pivot head 514 of the knuckle 510. The difference in diameter between the friction pad retention slot 542 and the friction pad retaining pin 560 can, in some embodiments, substantially define the range of motion of the friction pad 540 about the pivot head 514 of the knuckle 510.

In some embodiments, the tension ring 35 is not rigidly attached to the upper pipe 10, thereby allowing longitudinal movement (e.g., in the axial direction) of the cable stay bundle 30 within the upper pipe 30. In such embodiments having an absence of any longitudinal restraint on the tension ring 35 from the cable casing (e.g., the upper pipe 10), stress variation of the cable stay bundle 30 does not impact the normal force used by the damping system 100, 101, 102 to generate the damping force, as there is substantially no variation in the normal force applied between the damper plate assembly 200 and the slider ring 300, thereby allowing suitable damping performance to be maintained under any configuration of the cable stay bundle 30.

The upper portion of the shroud 40 acts as a limit on the radial deflection of the upper pipe 10, serving to prevent excessive relative radial movements of the upper pipe 10 and cable stay bundle 30 contained therein relative to the lower pipe 20. Such excessive radial deflections can occur, for example, during extreme meteorological events (e.g., high winds) and/or accidental load cases, thereby preventing uncontrolled impact between the cable stay bundle 30 (e.g., as contained within the upper pipe 10) and the lower pipe 20 or the slider ring 300. In such embodiments, the upper pipe 10, or a radially provided stopper element (see, e.g., radially outer portion of mechanical stopper plate 230, FIG. 10) arranged thereabout, will contact the inner surface of the shroud 40 to prevent damage from occurring to the cable stay bundle 30. An example of this can be seen, for example, by the radially outwardly protruding portions of the support ring 410, as shown in FIG. 4.

The damping systems 100, 101, 102 disclosed herein are each designed to provide the specified performance for the service conditions of the supported structure (e.g., the bridge) for which the cable stay bundle 30 is provided to provide structural support. Effects of variation in tension of the cable stay bundle 30 and static deformations due to transverse loading on the cable stay bundle 30 are accordingly taken into account, in order to avoid unacceptable variations in damping performance. The integrated friction damper (e.g., friction damper assembly 200, with slider ring 300) accommodates such movements of the cable stay bundle 30, allowing free movement of the tension ring 35 longitudinally inside the upper pipe 10 and due to the width of the slider ring 300 to accommodate transverse movement.

In embodiments where the end of the lower pipe 20, to which the slider ring 300 is attached, is not precisely perpendicular with the longitudinal axis of the cable stay bundle 30, it may be possible for the frictional contact surface of the slider ring 300 to not be arranged in a plane perpendicular to the longitudinal axis of the upper pipe 10 (e.g., the portion of the upper pipe 10 immediately adjacent to the damping system 100, 101, 102, considering that the upper pipe 10 will likely have a curved, or arcuate, shape when installed over a cable stay bundle 30 under tension) and, therefore, to the friction pads (e.g., 220, 540). In order to guarantee a sufficiently balanced normal load at all the friction pads (e.g., 220, 540) in contact with the frictional contact surface of the slider ring 300, each friction pad (e.g., 220, 540) is mounted on an individual shaft-like structure (e.g., including knuckle 510 and compression pad 520 within each attachment cavity 420B) providing longitudinal movement (e.g., by compression of the compression pad 520) and rotation capability (e.g., by rotation of the friction pad 540 about the pivot head 514), such that each of the friction pads 540 can remain in frictional contact with the slider ring 300 even when the support ring 410 is inclined relative to (e.g., not parallel to) the slider ring 300. In some embodiments, non-perpendicularity between the support ring 410 and the frictional contact surface of the slider ring 300 and/or the bottom surface (e.g., the surface furthest from the support ring 410) of the friction pad(s) 540 of up to and including 10 mrad can be accommodated. In some embodiments, the surface of the friction pad(s) 540, when uncompressed and/or compressed) in contact with the slider ring 300 is an entirely planar surface. In some embodiments, the surface of the friction pad(s) 540 can have non-planar surface, whether when uncompressed and/or when compressed against the slider ring 300.

Sliding movement between the friction pads 540 and the slider ring 300 generates, due to the normal force acting therebetween, a frictional force in a radial direction (e.g., in the plane defined by the contact surface of the slider ring 300 and/or of the friction pad(s) 540) that acts to dissipate the mechanical energy of the cable. Consequently, the vibrations (e.g., lateral transverse relative movements) of the cable stay bundle 30 are damped. Damping occurs only after the static friction force is balanced by the force causing the transverse movement of the cable stay bundle 30. Unless a transverse displacement force greater in magnitude and direction than the static friction force (e.g., "stiction") is transmitted to the cable stay bundle 30, no relative movement between the upper pipe 10 and the lower pipe 20, or the components of the damping system (e.g., 100, 101, 102) attached thereto, will occur. As such, there exists a threshold amplitude for an input force that would cause an undamped cable stay bundle 30 to move in a transverse direction, below which the components of the damper system 100, 101, 102 remain static. As such, when a transverse deflection force having a magnitude below the static friction force provided by the damping system 100, 101, 102, the damping system 100, 101, 102, the cable stay bundle 30, the upper pipe 10, the lower pipe 20, and the shroud 40 will move in unison and will not be deflected relative to each other in the transverse direction. As such, it is advantageous for such damping systems to be designed to create a frictional interface (e.g., between the friction pads 220, 540 and the slider ring 300) which dissipates the maximum of mechanical energy while keeping the threshold amplitude below a specified value deemed acceptable for the supported structure in term of fatigue, user comfort, and the like.

The materials selected for the surfaces of the friction pads 220, 540 and the slider ring 300 in contact with each other are advantageously selected to suppress adhesion effects that might induce a so-called "stick-slip" phenomenon (e.g., that caused by "stiction," such as by the presence of a static frictional force). This allows accurate control of the threshold amplitude. As such, movement of the cable stay bundle 30 due to a force having a transversely-oriented vector with amplitude smaller than the defined threshold amplitude will not induce a deviation force between the damper plate assembly 200 and the slider ring 300 that is large enough to cause relative movement therebetween, such that the damping system 100, 101, 102, the cable stay bundle 30, the upper pipe 10, the lower pipe 20, and the shroud 40 will move in unison. For such small amplitude forces in the transverse direction, the relative components of the damping system 100, 101, 102 do not move relative to each other. As the amplitude of the vibration force and/or transverse displacement force increases, crossing above the threshold amplitude, the components of the damping system 100, 101, 102 are kinetically "activated" and the friction pads 220, 540 slide over the contact surface of the slider ring 300, due to the relative movement between the upper pipe 10 (e.g., along with the cable stay bundle 30) and the lower pipe 20, the normal force acting between the friction pads 220, 540 and the slider ring 300 generating a frictional force having a vector substantially opposite that of the vibration force and/or transverse displacement force, such that the damping system 100, 101, 102 provides sufficient damping to the cable stay bundle 30 to dissipate substantially all mechanical energy introduced into the cable stay bundle 30 (e.g., by wind, seismic shifting, movement of items, such as automobiles, trains, and/or pedestrians on and/or in the support structure, and the like. The radial, or transverse, movement of the cable stay bundle 30 is stabilized by the frictional force generated by the damping system 100, 101, 102 to a maximum amplitude corresponding to the stationary point (e.g., the point where the components of the damping system 100, 101, 102 come to rest when the frictional force is the same as or greater than the vibration force and/or the transverse displacement force, such that the components of the damping system 100, 101, 102 cease moving relative to each other). Once the excitation effect (e.g., the vibration force and/or the transverse displacement force) dissipates sufficiently and/or ceases, the transverse displacement of the cable stay bundle 30 begins to decrease in amplitude (e.g., immediately) and the components of the damping system 100, 101, 102 may remain active (e.g., in motion relative to each other) until the vibration amplitude is reduced, for example, reduced to below half of the threshold amplitude.

In some embodiments, the incidence of a variation in the frictional force induced between the friction pads 220, 540 and the slider ring 300 does not cause a variation of the damping ratio, but only on the threshold amplitude. The damping performance of the damping system 100, 101, 102 is related to the kinetic energy dissipated, which can be interpreted as the product of the frictional force and the displacement distance of the components of the damping system 100, 101, 102 moving relative to each other over one period of vibration. The magnitude of the frictional force is inversely proportional to the transverse movement of the damper plate assembly 200 relative to the slider ring 300. As such, the transverse movement of the damper plate assembly 200 relative to the slider ring 300 increases when the magnitude of the frictional force decreases and, conversely, the transverse movement of the damper plate assembly 200 relative to the slider ring 300 decreases when the magnitude of the frictional force increases. The resultant kinetic energy dissipated may thus not necessarily be larger. However, a smaller frictional force can make the components of the damping system 100, 101, 102 follow a longer path. The product of both quantities (e.g., force and displacement) is not necessarily smaller than the initial value. Inaccuracy of the frictional force due to various reasons (e.g., inaccuracy in the weight of the components generating the normal force, potential friction between the upper pipe 10 and the cable stay bundle 30, and the like), results in reducing or increasing the estimated frictional force between the friction pads 220, 540 and the slider ring 300. Therefore, while the damping performance of the damping system 100, 101, 102 would not be negatively affected, the activation amplitude (e.g., the threshold amplitude) of the mobile components of the damping system 100, 101, 102 would be altered.

The tension of the cable stay bundle 30 may change during the service life thereof, which is generally many years and/or decades. Damping performance of the damping systems 100, 101, 102 as disclosed herein are not affected by such gradual variations in tension of the cable stay bundle 30. Since the threshold amplitude is the only parameter that changes when the tension of the cable is altered (e.g., decreases or increases), the only impact in damping efficacy is that the mobile components of the damping systems 100, 101, 102 disclosed herein may experience marginally greater relative displacements over time as the cable stay bundle 30 gradually loses tension due to marginal elongation thereof. As the tension on the cable stay bundle 30 decreases, the cable stay bundle 30 will gradually sag (e.g., have a more curved profile). Such a "sag effect" on a cable stay bundle 30 may affect damping performance marginally. Higher tension values for a cable stay bundle 30 produce smaller sag of the cable stay bundle 30 and, consequently, a smaller associated loss of damping performance of damping systems 100, 101, 102 attached thereto.

Since the internal components of the damping systems 100, 101, 102 disclosed herein are protected between the lower pipe 20 and the upper pipe 10, the likelihood that the components of such damping systems 100, 101, 102 will experience any mechanical damage during the service life thereof is greatly reduced compared to conventionally known damping systems. Life duration of the integrated damping system 100, 101, 102 and an inspection regime should be established based on the predicted wear of the friction pad(s) 220, 540. Inspection of the components of the damping system 100, 101, 102 can advantageously be performed via an endoscope by removing the shroud 40. During this inspection process, it is not necessary to lift off the upper pipe 10 and thereby de-activate the damping system 100, 101, 102. As such, the damping system 100, 101, 102 remains functional during the inspection and the inspection can be performed during operation of the structure (e.g., bridge) on which the cable stay bundle 30 is installed.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

The invention claimed is:

1. A damping system for installation about a cable disposed within an upper pipe and a lower pipe, the damping system comprising:
   a damper plate assembly connected to the upper pipe; and
   a slider ring connected to and/or supported by the lower pipe, wherein the slider ring comprises a hole in which the cable is arranged;
   wherein the cable is coupled to the upper pipe, such that movement of the cable in a transverse direction, relative to an axial direction of the cable, causes a corresponding transverse movement of the upper pipe relative to the lower pipe; and
   wherein the damper plate assembly and the slider ring are in contact with each other such that the transverse movement of the upper pipe relative to the lower pipe generates a frictional force to reduce an amplitude of the transverse movement of the upper pipe relative to the lower pipe.

2. The damping system of claim 1, wherein the cable comprises a plurality of individual cable strands to form a cable strand bundle.

3. The damping system of claim 2, comprising a tension ring arranged about the cable strand bundle, within the upper pipe, to compress the cable strand bundle together.

4. The damping system of claim 3, wherein the tension ring is attached to the upper pipe, such that the upper pipe and the cable strand bundle move substantially in unison.

5. The damping system of claim 1, wherein the cable is movable in the axial direction within and/or relative to the upper pipe and/or the lower pipe.

6. The damping system of claim 1, wherein a weight of the cable is transferred to the upper pipe to exert a normal force between the damper plate assembly and the slider ring, the normal force being used to generate the frictional force.

7. The damping system of claim 1, comprising a shroud surrounding the damping system at a position where the upper pipe is adjacent to the lower pipe, such that the damper plate assembly and the slider ring are covered by the shroud.

8. The damping system of claim 7, wherein the damper plate assembly comprises a support ring attached to an end of the upper pipe adjacent to the lower pipe and at least one friction pad arranged circumferentially and/or radially about a perimeter of the support ring to contact the slider ring to generate the frictional force to resist the transverse movement of the upper pipe relative to the lower pipe.

9. The damping system of claim 8, wherein:
   the support ring comprises a plurality of attachment cavities formed in a surface of the support ring that faces the slider ring when the support ring is attached to the upper pipe;
   a knuckle is secured within each of the plurality of attachment cavities;
   each knuckle comprises a pivot head on an end thereof adjacent to the slider ring; and
   each friction pad has a depression with a shape, or internal contour, corresponding to a shape, or external contour, of the pivot head, so that each friction pad is pivotable about the pivot head to ensure a contact surface of the friction pad remains parallel to, and in contact with, the slider ring, even when the support ring and the slider ring are not parallel with each other, or otherwise become inclined relative to each other.

10. The damping system of claim 9, comprising, in each attachment cavity, a compression pad arranged between the knuckle and a bottom of the attachment cavity in which the knuckle is arranged, the compression pad being in contact with a surface of the knuckle opposite the pivot head;
   wherein the knuckle comprises a knuckle retention cavity formed in an annular surface thereof;
   wherein the knuckle is movably secured to the support ring by at least one knuckle retention pin that passes through the support ring and at least partially into the knuckle retention cavity;
   wherein the knuckle retention cavity has a depth, in a direction of a depth of the attachment cavity, that defines, due to engagement of the knuckle retention pin within the knuckle retention cavity, a permissible deflection distance of the knuckle within the cavity of the support ring in which the knuckle is arranged; and
   wherein the compression pad is compressed by a vertical movement of the knuckle within the cavity, thereby allowing the friction pad of one or more knuckles to be a different distance from the support ring in the axial direction when the support ring and the slider ring are not parallel with each other, or otherwise become inclined relative to each other.

11. The damping system of claim 8, wherein the support ring extends radially out by a predetermined distance beyond an outer circumferential surface of the upper pipe, such that the support ring is configured to contact the shroud before the cable contacts the slider ring to limit transverse movement of the cable to prevent damage to the cable.

12. The damping system of claim 1, comprising a shroud surrounding the damping system at a position where the upper pipe is adjacent to the lower pipe, such that the damper plate assembly and the slider ring are covered by the shroud, wherein the damping system can be visually inspected without removing the shroud.

13. The damping system of claim 1, wherein the transverse direction is defined within a plane that is substantially defined by the upper planar surface of the slider ring.

14. The damping system of claim 1, wherein the frictional force is in a direction substantially opposite the transverse movement of the upper pipe relative to the lower pipe.

15. A cable-stay bridge comprising one or more of the damping system of claim 1.

16. A method of damping movement and/or vibration of a cable disposed within an upper pipe and a lower pipe, the method comprising:
   connecting a damper plate assembly to the upper pipe;
   connecting a slider ring to the lower pipe, wherein the slider ring comprises a hole in which the cable is arranged;
   coupling the cable to the upper pipe, such that movement of the cable in a transverse direction, relative to an axial direction of the cable, causes a corresponding transverse movement of the upper pipe relative to the lower pipe;
   arranging the upper pipe and the lower pipe such that the damper plate assembly and the slider ring contact each other; and
   moving the upper pipe in the transverse direction relative to the lower pipe to generate a frictional force to reduce an amplitude of the transverse movement of the upper pipe relative to the lower pipe.

17. The method of claim 16, wherein the cable comprises a plurality of individual cable strands to form a cable strand bundle.

18. The method of claim 17, comprising compressing, using a tension ring arranged about the cable strand bundle, within the upper pipe, the cable strand bundle together.

19. The method of claim 18, wherein the tension ring is attached to the upper pipe, such that the upper pipe and the cable strand bundle move substantially in unison.

20. The method of claim 16, wherein the cable is movable in the axial direction within and/or relative to the upper pipe and/or the lower pipe.

21. The method of claim 16, comprising transferring a weight of the cable to the upper pipe to exert a normal force between the damper plate assembly and the slider ring, the normal force being used to generate the frictional force.

22. The method of claim 16, comprising attaching a shroud about the upper pipe and the lower pipe, such that the damper plate assembly and the slider ring are covered by the shroud.

23. The method of claim 22, wherein the damper plate assembly comprises a support ring attached to an end of the upper pipe adjacent to the lower pipe and at least one friction pad arranged circumferentially and/or radially about a perimeter of the support ring to contact the slider ring to generate the frictional force to resist the transverse movement of the upper pipe relative to the lower pipe.

24. The method of claim 23, comprising:
   forming a plurality of attachment cavities in a surface of the support ring that faces the slider ring when the support ring is attached to the upper pipe;
   securing a knuckle within each of the plurality of attachment cavities, each knuckle comprising a pivot head on an end thereof adjacent to the slider ring; and
   forming, in each friction pad, a depression with a shape, or internal contour, corresponding to a shape, or external contour, of the pivot head, so that each friction pad is pivotable about the pivot head to ensure a contact surface of the friction pad remains parallel to, and in contact with, the slider ring, even when the support ring and the slider ring are not parallel with each other, or otherwise become inclined relative to each other.

25. The method of claim 24, comprising arranging, in each attachment cavity, a compression pad between the knuckle and a bottom of the attachment cavity in which the knuckle is arranged, the compression pad being in contact with a surface of the knuckle opposite the pivot head;
   wherein the knuckle comprises a knuckle retention cavity formed in an annular surface thereof;
   wherein the knuckle is movably secured to the support ring by at least one knuckle retention pin that passes through the support ring and at least partially into the knuckle retention cavity;
   wherein the knuckle retention cavity has a depth, in a direction of a depth of the attachment cavity, that defines, due to engagement of the knuckle retention pin within the knuckle retention cavity, a permissible deflection distance of the knuckle within the cavity of the support ring in which the knuckle is arranged; and
   wherein the compression pad is compressed by a vertical movement of the knuckle within the cavity, thereby allowing the friction pad of one or more knuckles to be a different distance from the support ring in the axial direction when the support ring and the slider ring are not parallel with each other, or otherwise become inclined relative to each other.

26. The method of claim 23, wherein the support ring extends radially out by a predetermined distance beyond an outer circumferential surface of the upper pipe, such that the support ring contacts the shroud before the cable contacts the slider ring to limit transverse movement of the cable to prevent damage to the cable.

27. The method of claim 16, wherein the transverse direction is defined within a plane that is substantially defined by the upper planar surface of the slider ring.

28. The method of claim 16, wherein the frictional force is in a direction substantially opposite the transverse movement of the upper pipe relative to the lower pipe.

29. The method of claim 16, comprising:
attaching a shroud about the upper pipe and the lower pipe, such that the damper plate assembly and the slider ring are covered by the shroud; and
visually inspecting at least one or more of the damper plate assembly and the slider ring without removing the shroud.

30. The method of claim 16, wherein the transverse direction is defined within a plane that is substantially defined by the upper planar surface of the slider ring.

* * * * *